(12) United States Patent
Jackson

(10) Patent No.: US 6,267,880 B1
(45) Date of Patent: Jul. 31, 2001

(54) MECHANICAL SCREEN, IN PARTICULAR FILTER APRON OF A CHAIN FILTER

(75) Inventor: Philip Jackson, Paris (FR)

(73) Assignee: E. Beaudrey & Cie a "Societe Anonyme", Paris (FR)

(*) Notice: Subject to any disclaimer, the term of this patent is extended or adjusted under 35 U.S.C. 154(b) by 0 days.

(21) Appl. No.: 09/502,466

(22) Filed: Feb. 11, 2000

(30) Foreign Application Priority Data

Feb. 11, 1999 (FR) .................................................. 99 01626

(51) Int. Cl.⁷ .................................................. B01D 33/056
(52) U.S. Cl. .................. 210/160; 210/232; 210/401; 210/455; 210/499
(58) Field of Search .................................. 210/160, 232, 210/400, 401, 455, 474, 477, 499

(56) References Cited

U.S. PATENT DOCUMENTS

| | | | |
|---|---|---|---|
| 755,256 | * 3/1904 | Taylor, Jr. ............................ | 210/455 |
| 2,286,332 | * 6/1942 | Bleyer ................................. | 210/160 |
| 3,706,378 | * 12/1972 | Markwick ............................ | 210/400 |
| 3,807,559 | * 4/1974 | Horn ................................... | 210/401 |
| 4,265,742 | 5/1981 | Bucker et al. . | |
| 4,383,919 | 5/1983 | Schmidt . | |
| 4,889,629 | * 12/1989 | Jackson .............................. | 210/401 |
| 4,960,510 | 10/1990 | Wolff . | |
| 5,242,583 | * 9/1993 | Thomas ............................... | 210/499 |
| 5,326,460 | * 7/1994 | Cheesman et al. ................. | 210/160 |
| 5,792,349 | * 8/1998 | Buettner et al. .................... | 210/499 |

* cited by examiner

Primary Examiner—Christopher Upton
(74) Attorney, Agent, or Firm—Young & Thompson

(57) ABSTRACT

A mechanical screen employs at least one filter chamber which includes a chassis in the form of a frame and a filter panel disposed transversely in the opening of the chassis and appropriately attached to it. Clipping elements between the filter panel and the chassis are used to attach the filter panel to the chassis. The filter panel, the uprights of the chassis and its longitudinal members are preferably made from materials inert to corrosion. Applications include chain filters.

15 Claims, 4 Drawing Sheets

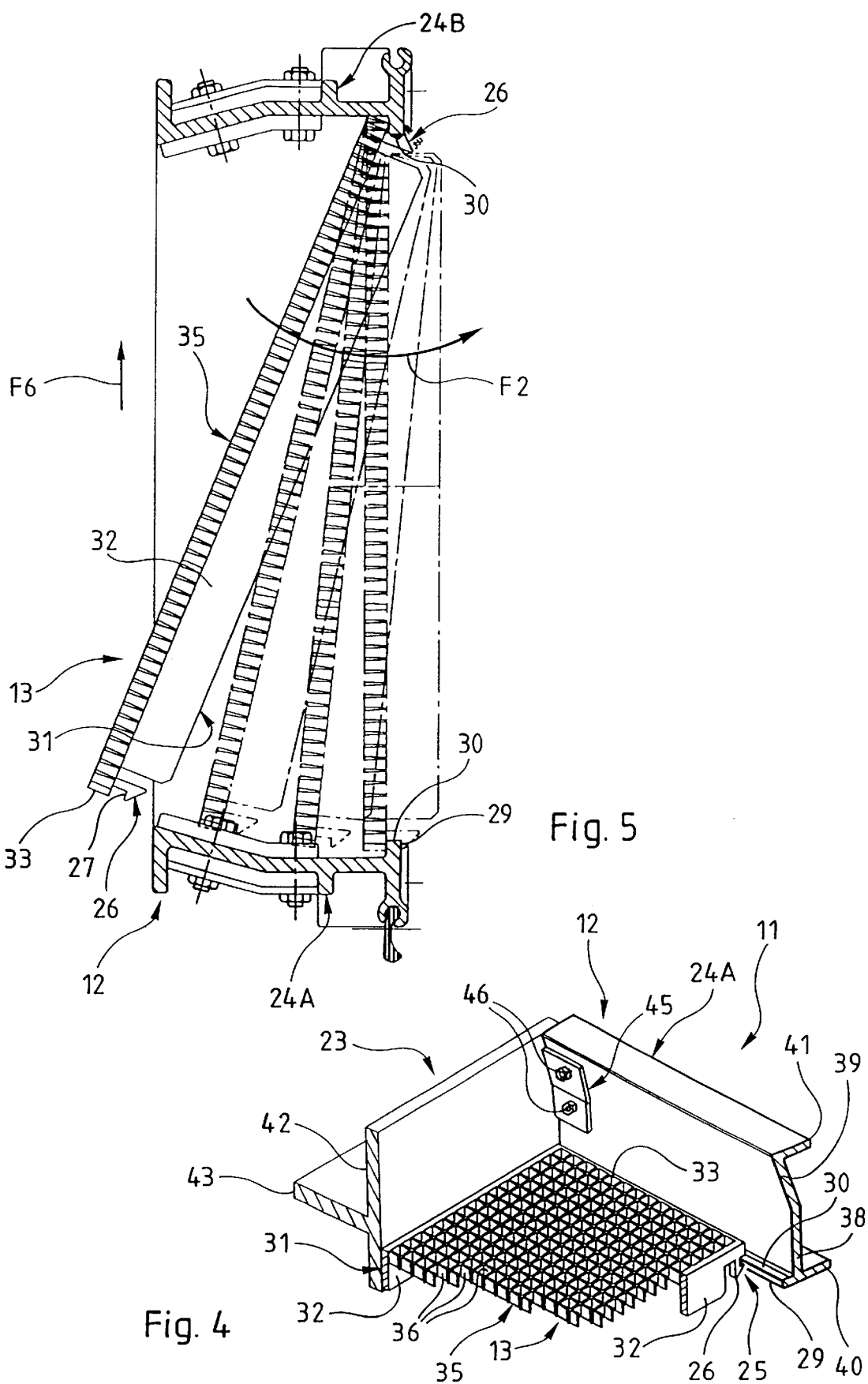

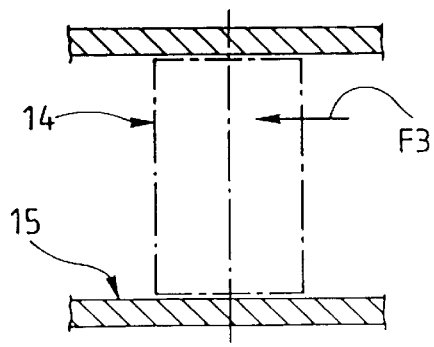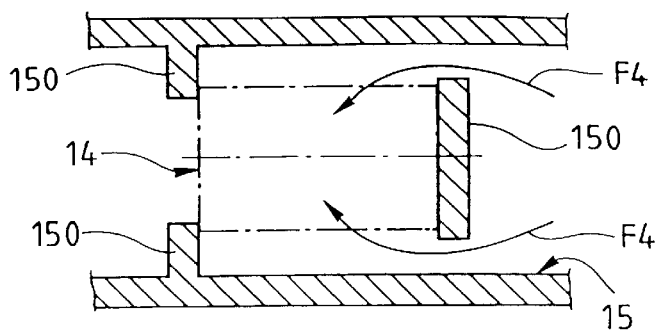
Fig. 6  Fig. 7
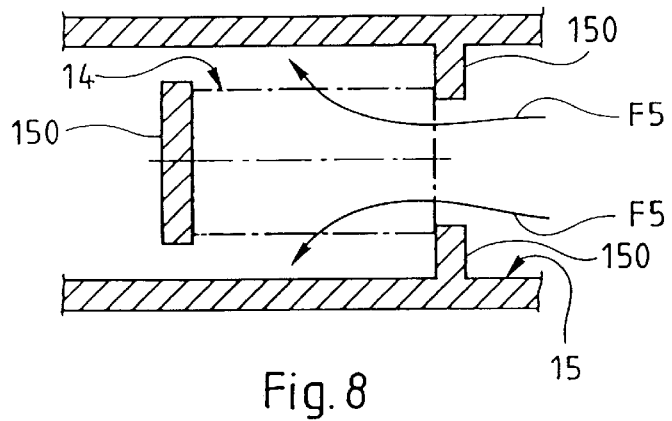
Fig. 8
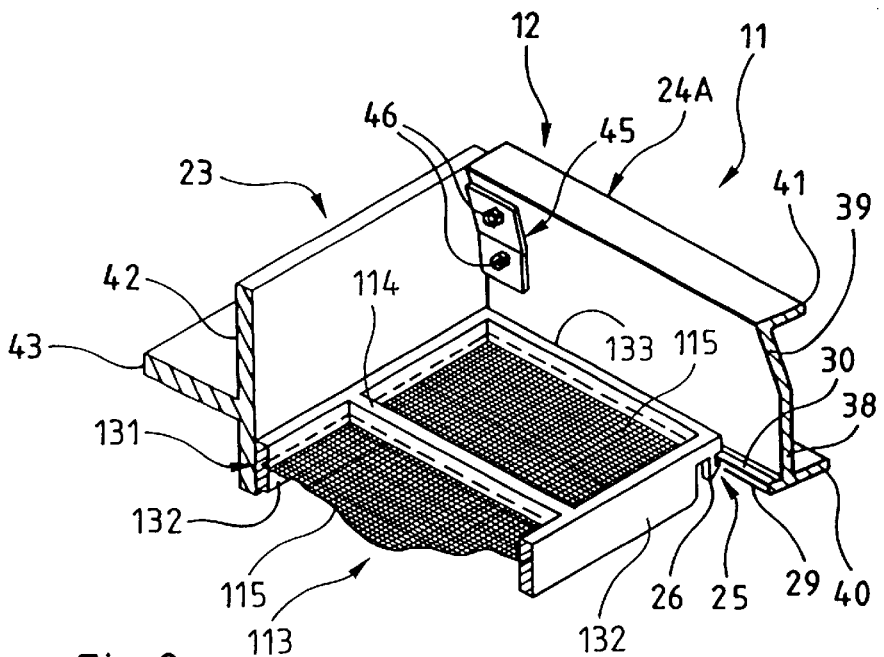
Fig. 9

MECHANICAL SCREEN, IN PARTICULAR FILTER APRON OF A CHAIN FILTER

BACKGROUND OF THE INVENTION

1. Field of the Invention

The present invention relates generally to mechanical screens adapted to separate from a flow of water debris or waste conveyed thereby.

It is aimed more particularly at mechanical screens which use at least one filter chamber including a chassis which is in the general form of a frame and a filter panel which is disposed transversely in the opening of the chassis, to which it is appropriately attached, whether the filter panel is in one piece or divided into separate filter panels appropriately disposed side-by-side.

A mechanical screen of this kind can form the filter apron of a chain filter, for example.

2. Description of the Prior Art

It then includes a plurality of filter chambers articulated to each other in an endless loop, in an arrangement like that described in U.S. Pat. No. 4,889,629.

It can instead be a rotary drum, for example, or even a static filter.

When, in the case of a chain filter or a rotary drum, a mechanical screen of this kind is mobile, each of its filter chambers operates like a bucket, temporarily retaining and entraining with it debris or waste held back by its filter panel until, on passing a cleaning device directing a contraflow of water through the filter panel, the debris or waste is separated from the filter panel and eliminated.

Be this as it may, one problem to be overcome in the manufacture of mechanical screens including filter chambers of this kind relates to the need to fasten the filter panel appropriately to the chassis.

At present the filter panel is usually a two-dimensional metal mesh or a two-dimensional perforated plate. In either case it has the disadvantage of being sensitive to corrosion, and attaching it to the chassis invariably entails the use of metal parts which are also sensitive to corrosion.

The attachment is usually performed by means of nuts and bolts, using metal bolts to clamp the screen between one frame fastened to the chassis and another frame formed of metal bars, for example.

The same applies in practice when, as described in the aforementioned U.S. Pat. No. 4,889,629, the filter panel forms a three-dimensional structure which, although it is usually made of metal, nevertheless has the advantage that it can be made from a synthetic material if required.

At present the chassis used for such filter panels are usually made of metal, for example annealed steel or stainless steel.

These chassis are inevitably costly and they are never totally resistant to corrosion.

To overcome this drawback, it has already been proposed to make the chassis from a material that is inert to corrosion, for example a synthetic or composite material.

Even so, the filter panel is attached to a chassis of this kind in the conventional way, using nuts and bolts.

The cost of the nuts and bolts, which in practice must be made of stainless steel, the cost of the bars forming the other frame associated with the nuts and bolts, which must also be made of stainless steel, and the cost of the labor for assembling the structure constitute an important part of the total cost of a mechanical screen.

Furthermore, given the various metal components employed, which at present include the filter panel itself, the structure remains highly vulnerable to corrosion, especially in stagnant water.

A general object of the present invention is an arrangement which avoids these drawbacks and has other advantages.

SUMMARY OF THE INVENTION

To be more precise, the present invention provides a mechanical screen employing at least one filter chamber including a chassis which is in the general shape of a frame and a filter panel which is disposed transversely in the opening of the chassis, to which it is appropriately attached, wherein, for attaching the filter panel to the chassis, clipping means are operative between the filter panel and the chassis.

Thus nuts and bolts are entirely avoided, which is advantageous.

To be more precise, all use of metal nuts and bolts and/or bars or other accessories is avoided, which is to the benefit of corrosion resistance and cost.

Furthermore, if it is necessary to change a filter panel as part of the maintenance of the system, the change can advantageously be done very easily and quickly, which is to the benefit of the cost, because it does not involve any loosening or tightening of nuts and bolts.

According to a first development of the invention, for each of the filter chambers used, the chassis and the filter panel are both made from a material that is inert to corrosion, which is to the benefit of the homogeneity of the system.

For example, the chassis is mainly made of a composite material, with the exception of any assembly nuts and bolts, and the filter panel is itself entirely made from synthetic materials.

Other things being equal, a filter panel made in this way from synthetic materials is advantageously lighter than if it were made of metal, which is to the benefit of reducing fatigue of the mechanical screen assembly, in particular its drive means and its guide means, and therefore to the benefit of reduced wear of the mechanical screen.

It is also and advantageously more economic.

However, in the case of a three-dimensional structure, the filter panel is inevitably rigid, and thus unable to bend, which normally means that the opening in the chassis for fitting it must be at least the same size everywhere.

The chassis must therefore normally have a globally parallelepipedal configuration.

According to another development of the invention, the fact that the filter panel is clipped to the chassis is exploited to impart a more advantageous configuration to the chassis.

To be more precise, the fact that clipping is effected by initially offering up the filter panel obliquely to the chassis, after which the filter panel is pivoted into place, is exploited.

According to this development of the invention, the chassis of the filter chambers having a four-sided contour in plan view, in the usual way, including two uprights alternating with two longitudinal members, the clipping means operative between the filter panel and a chassis of this kind are on at least the longitudinal members thereof, and preferably only the longitudinal members, and the longitudinal members preferably have a globally curved profile in cross section with its concave side facing toward the inside of the chassis.

This globally curved profile has a two-fold advantage.

Firstly, it is beneficial for clipping the filter panel to the chassis by advantageously guiding the filter panel during its pivoting motion that is all that is required to bring about the clipping.

Also, and most importantly, by making the two longitudinal members of the chassis convergent, it contributes to a relative reduction in the size of the opening in the chassis, which advantageously strengthens the bucket function of the filter chambers, to the benefit of the retention and entrainment of debris or waste held back by the filter panel.

Thus two apparently contradictory objects are advantageously reconciled, namely easy fitting of the filter panel despite it being rigid and a convergent configuration of the chassis.

The features and advantages of the invention will emerge from the following description which is given by way of example only and with reference to the accompanying diagrammatic drawings.

BRIEF DESCRIPTION OF THE DRAWINGS

FIG. 4 is a diagrammatic partial perspective view of the chamber.

FIG. 5 is a sectional view to a different scale of a filter chamber deduced from that of FIG. 2 and showing the fitting of a filter panel to its chassis.

FIG. 6 is a view in section taken along the line VI—VI in FIG. 1.

FIGS. 7 and 8 are analogous to FIG. 6, each showing a variant of a chain filter.

FIG. 9 is analogous to FIG. 4 and shows a variant filter panel.

DETAILED DESCRIPTION OF THE PREFERRED EMBODIMENTS

Figure 1:
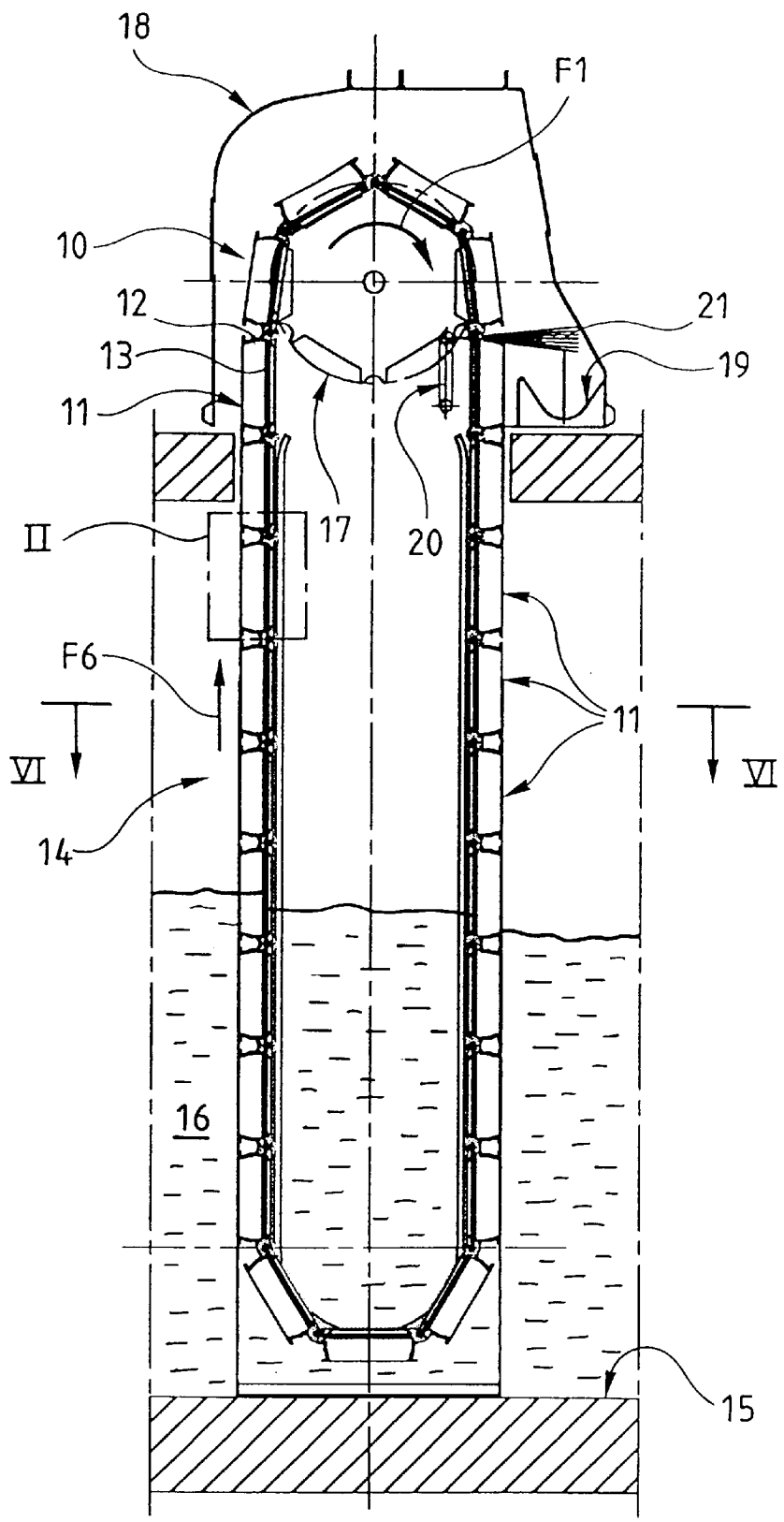
FIG. 1 is a sectional lateral elevation view of a mechanical screen using filter chambers in accordance with the invention.
Figure 2:
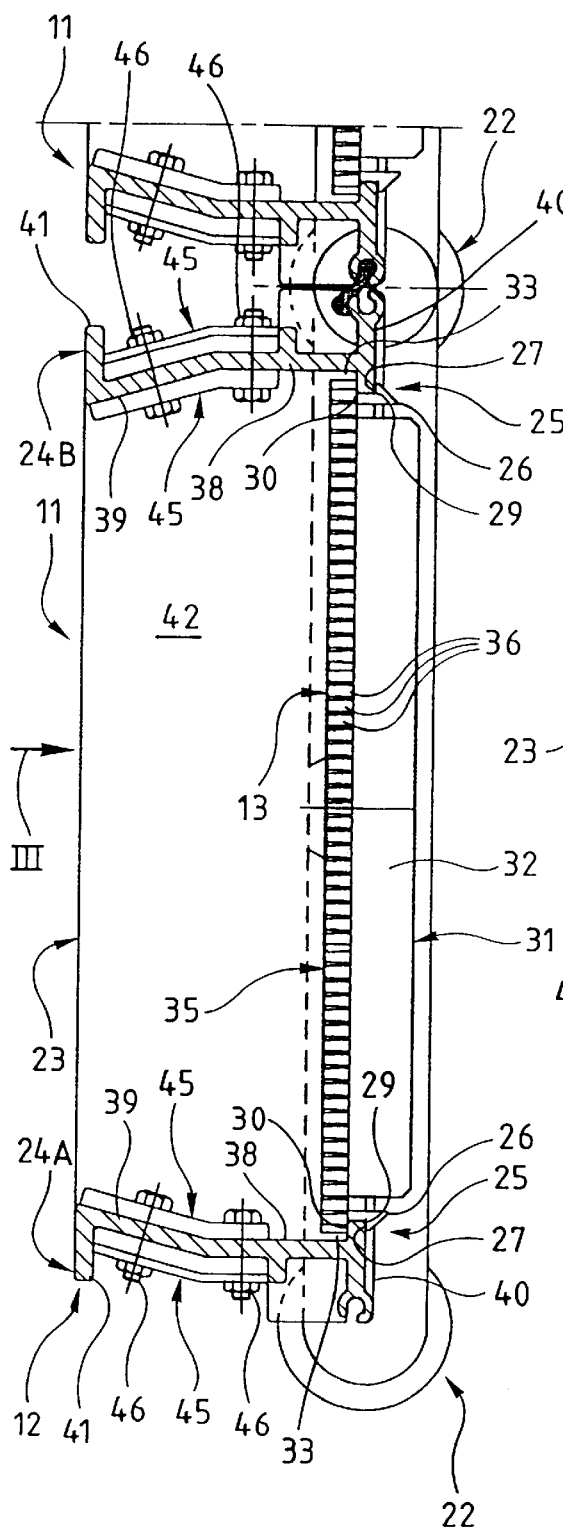
FIG. 2 shows to a larger scale the detail II from FIG. 1 relating more precisely to a filter chamber.
Figure 3:
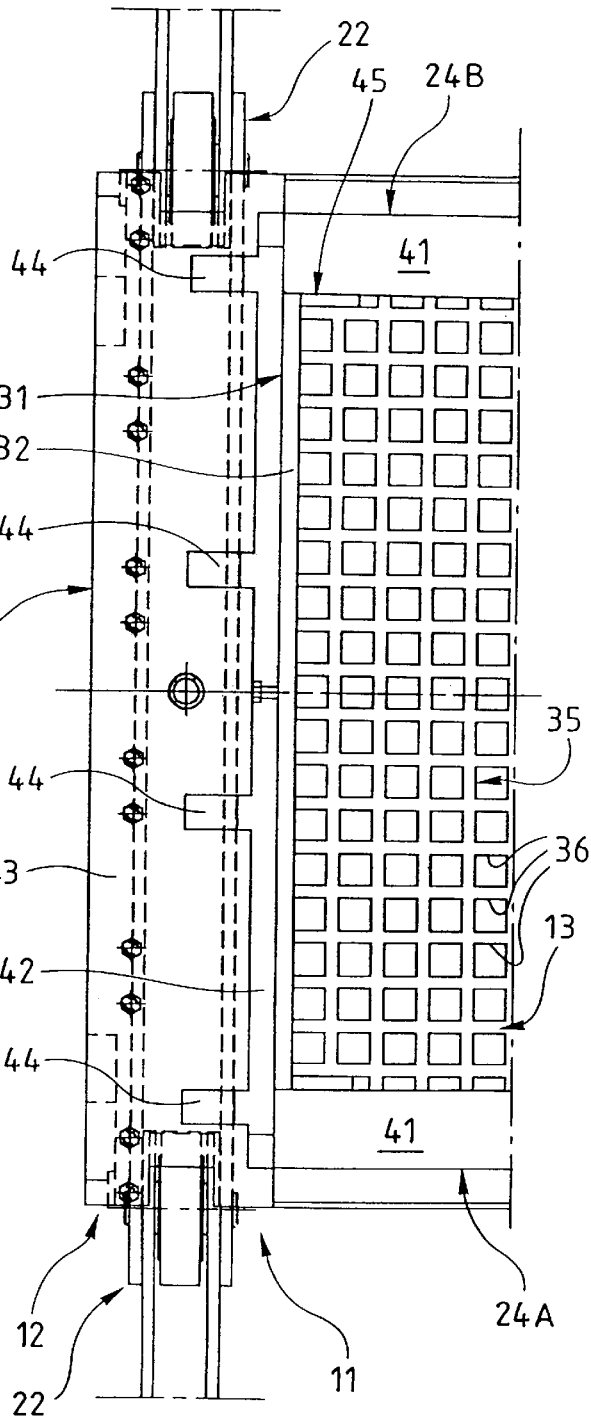
FIG. 3 is a partial elevation view of the filter chamber as seen in the direction of the arrow III in FIG. 2.

As shown in the figures, the mechanical screen 10 in accordance with the invention includes at least one filter chamber 11 which has a chassis 12 in the general shape of a frame and a filter panel 13 disposed transversely in the opening of the chassis 12, to which it is appropriately attached.

In practice, the figures show more particularly the application of the invention to the situation in which, including a plurality of filter chambers 11 successively articulated to each other in a closed loop, the mechanical screen 10 forms the filter apron of a chain filter 14.

In practice the mechanical screen 10 therefore extends vertically across a channel 15 in which a flow 16 of water to be treated circulates, intercepting the flow, and is suspended by its upper part, which is immersed, from a drive wheel 17 which is operative in line with a superstructure 18, and its bottom part cooperates with sealing means, not shown, between it and the bottom of the channel 15.

The filter chambers 11 are open toward the outside and the direction of rotation of the drive wheel 17, which is shown by an arrow F1 in FIG. 1, is such that the upstream run of the assembly moves upward, as shown by the arrows F6 in FIGS. 1 and 5, so that, operating in the manner of buckets, the filter chambers 11 of the upstream run entrain with them debris and waste held back by their filter panel 13.

After passing around the drive wheel 17 the filter chambers 11 discharge into a transverse evacuation trench 19 provided for this purpose in the superstructure 18, on the same side as the downstream run of the assembly, and to facilitate discharging them a cleaning device 20 directs a contraflow of water 21 through their filter panel 13 from the inside.

The features described above are well known in the art, in particular from the aforementioned U.S. Pat. No. 4,889,629, and will not be described in more detail here because they do not of themselves form any part of the present invention.

In particular, the articulation means 22 connecting the filter chambers 11 two-by-two like the links of a chain will not be described here.

What is more, all the filter chambers 11 are identical, and so only one of them will be described.

Also, the chain filter 14 can clearly be of the direct flow type: this is the case with the chain filter 14 shown in FIG. 1, FIG. 6 showing that in this case the flow of water to be treated, indicated by the arrow F3 in the figure, passes through the entire filter.

However, the chain filter 14 could instead be of the dual-flow type with chicanes formed by partitions 150 (see FIGS. 7 and 8): in FIG. 7, two flows F4 of water pass through the filter from the outside toward the inside; in FIG. 8, two flows F5 of water pass through the filter from the inside toward the outside.

In a manner that is known in the art, the chassis 12 of a filter chamber 11 has a four-sided contour in plan view, in practice a rectangular contour, with two uprights 23 parallel to the direction of movement of the assembly alternating with two longitudinal members 24A, 24B perpendicular to that direction.

The associated filter panel 13 has a complementary four-sided contour in plan view and is substantially at the base of the uprights 23 and the longitudinal members 24A, 24B.

If required, the filter panel 13 can be in one piece covering all of the opening in the chassis 12 formed by the uprights 23 and the longitudinal members 24A, 24B.

However, it is preferable, in particular for ease of construction and installation, for the filter panels 13 to be divided into separate filter panels disposed side-by-side, as shown in FIG. 4.

Nevertheless, for convenience, the following description first considers a single filter panel 13 in the opening of the chassis 12 of a filter chamber 11.

According to the invention, clipping means 25 operative between the filter panel 13 and the chassis 12 are used to attach the filter panel 13 to the chassis 12.

In the embodiment shown, the clipping means 25 include, here on the filter panel 13, at least one clip 26 which is globally hook-shaped with a detent 27 and a shoulder 29 on the chassis 12 with which the detent 27 on the clip 26 of the filter panel 13 engages.

In a variant that is not shown the structures are interchanged, i.e. the clip 26 is on the chassis 12 and the shoulder 29 is on the filter panel 13.

To be more precise, in the embodiment shown, the clip 26 on the filter panel 13 is set back relative to one side of the filter panel 13 and the shoulder 29 on the chassis 12 is part of a rib 30 on the corresponding side thereof which projects inward into the opening of the chassis 12 and on which the filter panel 13 bears.

In practice the filter panel 13 has four clips 26 in pairs respectively disposed at the ends of two of its opposite sides, relative to which they are set back.

In the embodiment shown, the filter panel 13 has a frame 31 at its periphery and its clips 26 are part of the frame 31.

To be more precise, they are formed in the plane of two opposite sides 32 of the frame 31 and are set back relative to the other two sides 33 thereof.

The two clips 26 at the ends of each side 32 of the frame 31 on which the clips 26 are formed extend globally back-to-back.

The two clips 26 at the ends of each side 33 relative to which the clips 26 are set back are in contrast globally parallel to each other.

For example, the filter panel 13 forms inside the frame 31 a three-dimensional array 35 of openings 36 of the same type as that described in the previously mentioned U.S. Pat. No. 4,889,629.

It is then inevitably somewhat rigid.

The resulting filter panel 13 is preferably made from materials inert to corrosion.

For example, it is entirely molded from synthetic materials.

The clipping means 25 operative between the filter panel 13 and the chassis 12 are preferably on at least the longitudinal members 24A and 24B of the chassis 12.

In the embodiment shown, the clipping means 25 are on only the longitudinal members 24A and 24B of the chassis 12.

In other words, there is a rib 30 only at the base of each of the longitudinal members 24A, 24B and the sides 33 of the frame 31 of the filter panel 13 relative to which its clips 26 are set back extend from one to the other of the longitudinal members 24A and 24B.

If, as here, the filter panel 13 is divided into separate filter panels disposed side-by-side, each of the separate panels extends in one piece from one to the other of the two longitudinal members 24A, 24B of the chassis 12 in the same way as described above for a one-piece filter panel 13.

As in the embodiment shown, the longitudinal members 24A and 24B of the chassis 12 have a globally curved profile in cross section whose concave side faces toward the inside of the chassis 12.

To be more precise, in this embodiment, each longitudinal member 24A and 24B of the chassis 12 has in succession, in a dihedral arrangement, starting from the filter panel 13, a first flat 38 which is substantially perpendicular to the filter panel 13 and a second flat 39 which is oblique to the filter panel 13 and converges toward the second flat 39 of the other longitudinal member in the direction away from the filter panel 13.

For example, the angle of the interior dihedron formed by the two flats 38, 39 is about 160° when the sides 32 of the frame 31 are about 600 mm long.

To be even more precise, in the embodiment shown, each longitudinal member 24A and 24B of the chassis 12 has a baseplate 40 at its base, i.e. along the free edge of its flat 38 and extending to either side of the flat 38, and this baseplate extends substantially parallel to the filter panels 13 and its interior part forms the corresponding rib 30. On its opposite side, i.e. along the free edge of its flat 39, the baseplate 40 has a rim 41 which is directed outward and extends substantially parallel to the baseplate.

The resulting longitudinal members 24A and 24B are preferably both made from materials inert to corrosion.

They are made from composite materials, for example.

In the embodiment shown, the longitudinal members 24A and 24B are in practice extruded sections or portions of extruded sections, for example.

The uprights 23 of the chassis 12 have a conventional structure and for the most part will not be described in detail here.

Suffice to say that, in a manner that is known in the art, each of them forms a flange 42 delimiting the opening of the assembly and, to enable the operation of the associated articulation means 22, each has a plate 43 projecting outward on the flange 42, substantially halfway up its height, to which the flange 42 is connected from place to place by stiffener ribs 44.

However, in the embodiment shown, the uprights 23 of the chassis 12 each have at each end two parallel flanges 45 between which the corresponding longitudinal member 24A or 24B is inserted.

The two flanges 45, which are perpendicular to the flange 42, are preferably in one piece therewith.

In the embodiment shown, they form a dihedron, like the longitudinal members 24A and 24B.

The resulting uprights 23 are preferably both made from materials inert to corrosion.

They are injection-molded from synthetic materials, for example.

At erection time, the longitudinal members 24A and 24B are assembled to the uprights 23 by means of nuts and bolts, for example using bolts 46 in the flanges 45, as shown here.

The assembly can instead or additionally be glued.

The filter panel 13 is fitted after assembly.

For example, and as shown in continuous line in FIG. 5, it is offered up obliquely in the opening of the chassis 12 until the clips 26 along one of its sides inter-engage with the rib 30 on the corresponding longitudinal member of the chassis 12.

The filter panel 13 is then pivoted about the rib 30, as shown by the arrow F2 in FIG. 5, until the clips 26 on its opposite side inter-engage with the ribs 30 on the other longitudinal member of the chassis 12, as shown in chain-dotted line in FIG. 5.

Clearly, the dihedron formed by the flats 38, 39 of that longitudinal member is made as compatible as possible with the path then traced out by the filter panel 13, given its rigidity.

Be this as it may, the dihedron closes up the opening in the chassis 12 on the same side as the free edge thereof, and this is beneficial to the bucket function of the filter chambers 11.

This applies all the more in that, for reasons of standardization, the two longitudinal members 24A and 24B of the chassis 12 are preferably identical to each other, as shown here, and therefore have the same transverse profile; however, the two longitudinal members 24A and 24B are clearly not necessarily identical; moreover, it is sufficient if only one of the longitudinal members, here the longitudinal member 24A, has the transverse profile 38, 39 described.

Of course, instead of resulting from successive flats 38 and 39, the transverse profile could be curved.

In practice, for each of the filter chambers 11 of the mechanical screen 10 made up of such filter chambers 11, the longitudinal members 24A and 24B of the chassis 12 extend transversely relative to the filter apron that the mechanical screen 10 forms, i.e. transversely to the direction of movement of the filter apron.

In operation, when it is in the flow 16 of water, the filter panel 13 of the filter chambers 11 resists the thrust due to the head loss across it by bearing on the ribs 30 on the chassis 12 and, when it reaches the cleaning device 20, the retaining effect of its clips 26 resists the thrust of the water jet 21.

Of course, the present invention is not limited to the embodiments shown and described, but encompasses any variant execution thereof.

In particular, the two longitudinal members 24A and 24B of the filter panel 13 described carry clipping means; the invention applies equally if the clipping means 25 are on only one of the two longitudinal members, the other longitudinal member including a lip or a groove adapted to cooperate with a groove or a lip along the corresponding side 33, opposite the frame 31.

The filter panel 13 described has a frame 31 inside which a three-dimensional array 35 of openings 36 is formed; FIG. 9 shows a variant filter panel in which the filter panel 113 has a frame 131 whose sides 132 and 133 are analogous to the sides 32 and 33 of the frame 31 of the filter panel 13; the frame 131 is compartmentalized by separators 114 extending parallel to the sides 133 from one side 132 to the other; each compartment defined in this way receives a mesh 115, for example a metal or woven polyester mesh, with its perimeter molded into the frame 131 and its separators 114. This makes it possible for the filter panel 113 to have fine openings or meshes, for example of 4 mm or less.

What is claimed is:

1. A mechanical screen employing at least one filter chamber including a chassis having an opening and a filter panel disposed transversely in the opening of said chassis;
    clipping means operative between said filter panel and said chassis for attaching said filter panel to said chassis; said clipping means including a hook-shaped clip with a detent on said filter panel, and a shoulder on said chassis; said detent being structured and arranged to inter-engage with said shoulder; said clip being set back relative to one side of said filter panel, and said shoulder being part of a rib projecting inward into the opening of said chassis on the corresponding side thereof and on which said filter panel bears.

2. The mechanical screen according to claim 1, wherein said filter panel has a four-sided contour in plan view and said mechanical screen includes four clips disposed in pairs at the ends of two opposite sides of said panel and set back relative thereto.

3. The mechanical screen according to claim 2, wherein said filter panel has a frame at its periphery and said clips are part of said frame.

4. The mechanical screen according to claim 3, including a plurality of filter chambers successively articulated to each other in an endless loop and forming a filter apron of a chain filter, and longitudinal members of said chassis which extend transversely relative to said filter apron.

5. The mechanical screen according to claim 3, wherein said frame is made from materials inert to corrosion.

6. The mechanical screen according to claim 5, wherein a three-dimensional array of openings is defined inside said frame.

7. The mechanical screen according to claim 5, wherein said frame supports a mesh.

8. The mechanical screen according to claim 1, including a plurality of filter chambers successively articulated to each other in an endless loop and forming a filter apron of a chain filter.

9. A mechanical screen employing at least one filter chamber including a chassis having an opening and a filter panel disposed transversely in the opening of said chassis;
    clipping means operative between said filter panel and said chassis for attaching said filter panel to said chassis;
    said chassis having a four-sided contour in plan view, said screen including two uprights alternating with two longitudinal members having a curved profile in cross section with a concave side facing toward the inside of said chassis, and said clipping means being disposed on at least one longitudinal member of said chassis.

10. The mechanical screen according to claim 9, wherein, starting from said filter panel, each of said longitudinal members has in succession and in a dihedral configuration, a first flat which extends substantially perpendicularly to said filter panel, and a second flat which is oblique to said filter panel and converges with the second flap of the other longitudinal member in the direction away from said filter panel.

11. The mechanical screen according to claim 9, wherein said clipping means are exclusively on said longitudinal members of said chassis.

12. The mechanical screen according to claim 9, wherein each of said uprights has at each end two flanges for inserting the corresponding longitudinal member therebetween.

13. The mechanical screen according to claim 9, wherein said uprights are both made from materials inert to corrosion.

14. The mechanical screen according to claim 9, wherein said longitudinal members are made from materials inert to corrosion.

15. The mechanical screen according to claim 9, including a plurality of filter chambers successively articulated to each other in an endless loop and forming a filter apron of a chain filter.

* * * * *